2,758,845

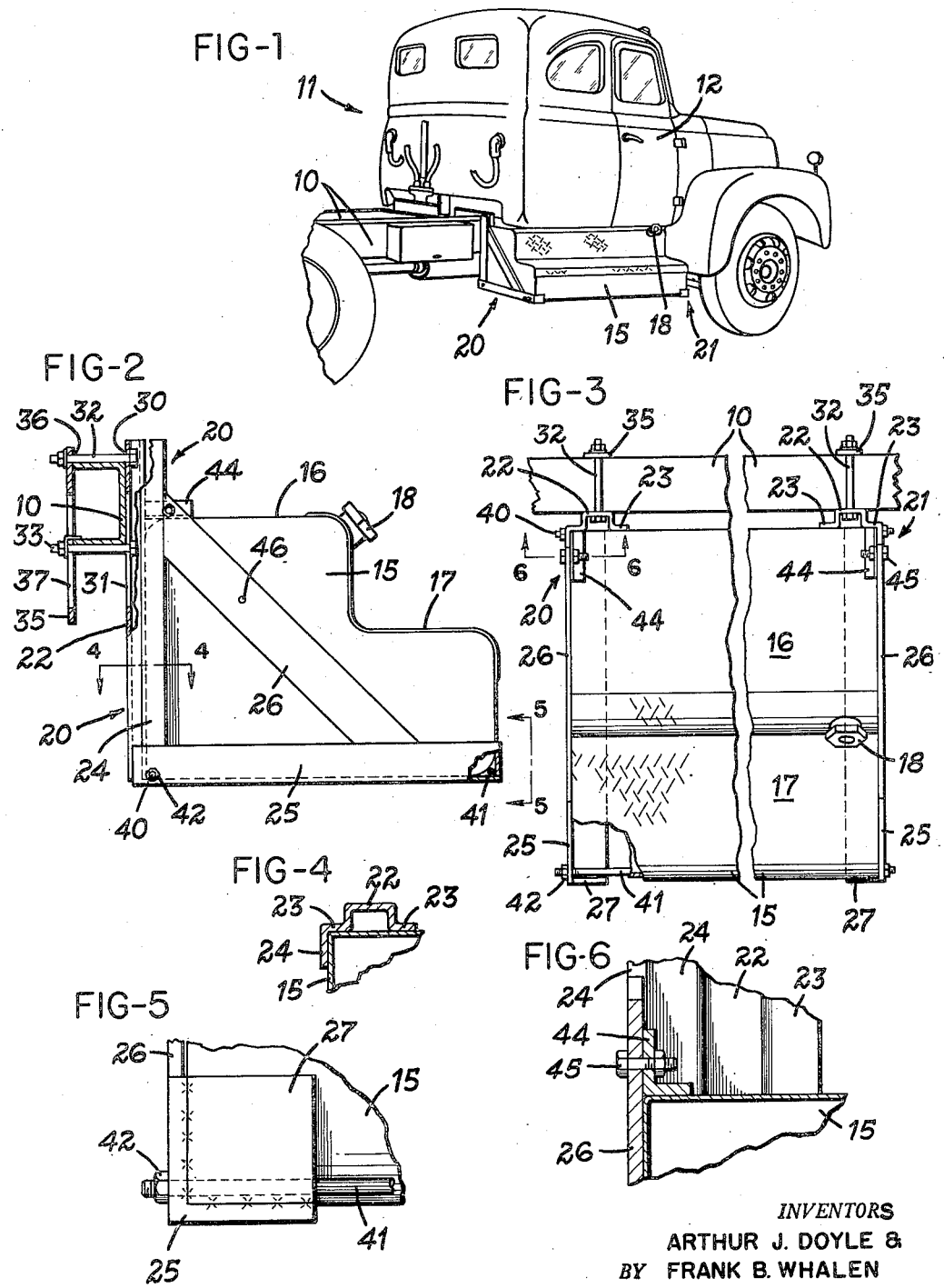
Aug. 14, 1956 — A. J. DOYLE ET AL — 2,758,845
VEHICLE FUEL TANK ASSEMBLY
Filed April 28, 1954 — 2 Sheets-Sheet 1
INVENTORS
ARTHUR J. DOYLE &
FRANK B. WHALEN
BY Marechal, Biebel, French & Bugg
ATTORNEYS

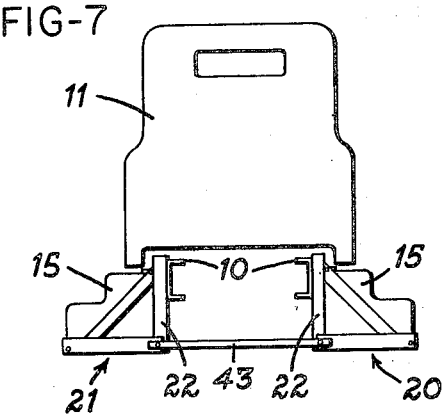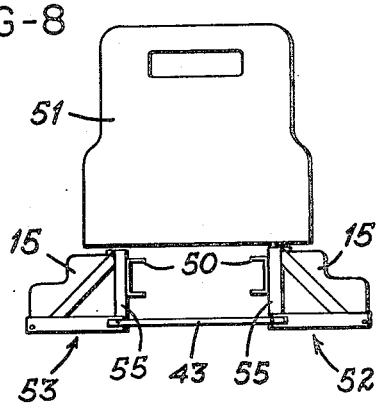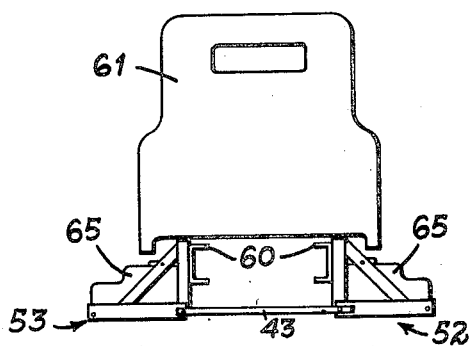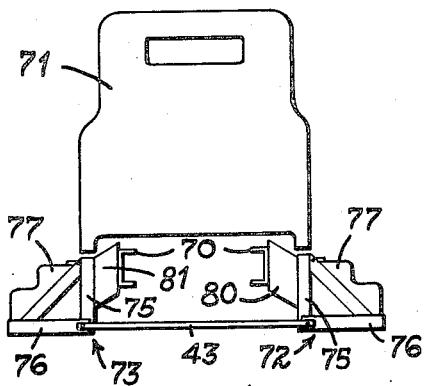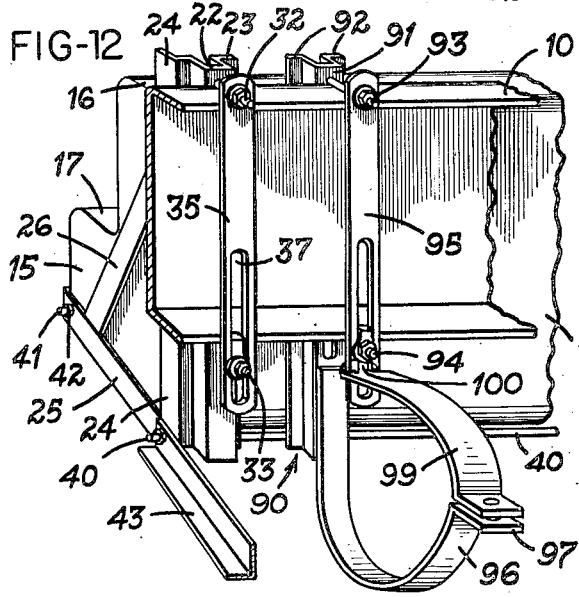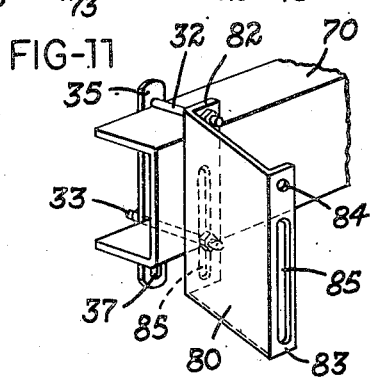
INVENTORS
ARTHUR J. DOYLE &
BY FRANK B. WHALEN
ATTORNEYS

United States Patent Office 2,758,845
Patented Aug. 14, 1956

VEHICLE FUEL TANK ASSEMBLY

Arthur J. Doyle, Middletown, Ohio, and Frank B. Whalen, Dallas, Tex., assignors to Prior Products, Inc., Dallas, Tex., a corporation of Texas Application April 28, 1954, Serial No. 426,191

8 Claims. (Cl. 280—5)

This application relates to fuel assemblies for trucks and like motor vehicles, and more particularly to a mounting assembly for supporting a fuel tank on the frame of such motor vehicle.

The invention has special relation to the mounting of a fuel tank for a truck or the tractor of a trailer truck which also serves as a step member for use by the driver or other occupant of the cab in entering or leaving the cab. For example, the invention is directly applicable to the mounting of a tank of this character which includes a step portion formed in or on the body of the tank, and especially to such a tank which has a generally L-shape in endwise elevation and can be mounted on the side frame of the truck adjacent the cab to form a pair of steps in place of the conventional running board or other step.

It is readily apparent that a tank of the above character is subjected to considerably greater stresses than the usual type of truck tank, since whenever it is used as a step, it must support the full weight of the driver or other user in addition to the weight of its fuel content. Such stresses are of course directly effective on the mounting of the tank, and they tend to exert a considerable extra bending moment on the connections between the mounting and the side frame of the truck. Furthermore, if such extra stresses should cause any weakness to develop in the mounting or the tank, then the normal load on the mounting during use of the truck is likely to cause such weakness to become worse. Such conditions are particularly likely to develop if the mounting assembly is rigid and more or less inflexible as in the case of welded connections between the tank itself and other parts of the mounting assembly.

It is broadly an object of the present invention to provide a mounting assembly for a step tank for a motor vehicle which is simple in construction, which is easy to mount on the truck frame, and especially which assures both high strength and maximum safety in use.

In accordance with the invention, the mounting assembly for the step tank is mechanically separate from the tank and includes bracket members which are mounted on the side frame of the truck and are adapted to receive the tank in endwise relation therebetween and to support the ends of the tank from below. These bracket members are also interconnected in such manner as to exert sufficient pressure endwise on the tank to clamp it in securely held relation, and they include parts which overlie the front and top of the tank to prevent possible displacement thereof either laterally or vertically with respect to the frame and bracket members.

It is accordingly another object of the present invention to provide a mounting assembly for a step tank as outlined above which is of such structural characteristics as to support the tank with sufficient flexibility to prevent shock and other loads incident to use from causing damage to the assembly while at the same time avoiding looseness such as might permit movement of the tank with respect to the remainder of the assembly.

It is also an object of the invention to provide such a mounting assembly which is readily adapted to truck frames of different sizes and types without requiring drilling, welding, or like operations having a tendency to create points of possible weakness.

Additional objects and advantages of the invention will be apparent from the following description, the accompanying drawing and the appended claims.

In the drawing—

Fig. 1 is a partial view in the nature of a perspective showing the tractor of a trailer truck provided with a step tank assembly constructed in accordance with the invention;

Fig. 2 is a view in end elevation, partly broken away, showing the fuel tank assembly of Fig. 1 in mounted position;

Fig. 3 is a top view of the assembly of Fig. 2, with portions broken away for purposes of increased clarity;

Fig. 4 is an enlarged fragmentary section on the line 4—4 of Fig. 2;

Fig. 5 is an enlarged fragmentary view looking in the direction indicated by the line 5—5 of Fig. 2;

Fig. 6 is an enlarged fragmentary section on the line 6—6 of Fig. 2;

Fig. 7 is a somewhat diagrammatic rear end view showing the application of the mounting assembly of Figs. 2–6 for mounting a pair of step tanks on a truck;

Figs. 8 and 9 are views similar to Fig. 7 showing the application of the invention to trucks of two other structural types;

Fig. 10 is a view similar to Fig. 7 showing the application of the invention to a truck whereon the cab overhangs the frame both laterally and downwardly;

Fig. 11 is a fragmentary perspective view further illustrating the arrangement of Fig. 10; and Fig. 12 is a fragmentary perspective view showing the assembly of Figs. 2 and 3 in combination with a supporting bracket for the air tank for the brakes of the truck.

Referring to the drawing, which illustrates preferred embodiments of the invention, the truck or tractor in Figs. 1 and 7 includes side frames 10 of channeled construction and the usual cab 11 having doors 12 on either side. A fuel tank 15 is shown in Fig. 1 as mounted on the right side frame 10, and Fig. 6 shows how a duplicate tank may be mounted on the other side frame. Each of the tanks 15 is L-shaped in endwise view to provide a pair of steps 16 and 17 at different levels on its upper surface, and these tanks are mounted in such positions that these steps lead directly to the doors 12 and the interior of the cab. The filling spout for the tank is indicated at 18.

The mounting assembly for each tank 15 includes a pair of brackets indicated generally at 20 and 21 and mounted on the frame 10 at opposite ends of the tank. Each of these brackets includes a vertical bar 22 of channeled section, but each of the side walls of the channel is turned outwardly approximately its midpoint to form a flange 23 which will abut the back of the tank. In addition, the outer flange 23 is provided with a further side flange 24 which is adapted to overlie the end of the tank as shown in detail in Fig. 4. The lower end of each of the upright members 22 carries an angle 25 which is welded to the flange 24 and projects outwardly therefrom.

The brackets 20 and 21 are arranged in pairs such that the flanges 24 and angles 25 face each other to receive the tank therebetween with the horizontal flanges of the angles lying beneath the ends of the tank in supporting relation therewith. Each bracket also includes a diagonally arranged reinforcing bar 26 welded to the angle 25 and to the side flange 24 of its associated upright member 22 to form a brace therebetween. In addition, a vertical plate 27 is welded in the outer end of each of the angles 25 to form a flange adapted to overlie the adjacent portion of the front of the tank, and the parts are so proportioned that the tank will fit smoothly between these flanges 27 and the flanges 23 on the upright members 22, satisfactory results having been obtained with this dimension approximately ⅛ inch greater than the corresponding dimension of the tank.

When this assembly is mounted on the side frame 10 of the truck, the brackets 20 and 21 are arranged with their upright members 22 abutting the outer face of the frame 10, and each of the members 22 is provided with an upper hole 30 and a lower slot 31 for receiving mounting bolts 32 and 33 respectively. As shown in Fig. 2, the upper bolt 32 is designed to fit over the frame 10, and the lower bolt 33 will fit below the frame, the slot 31 providing for vertical adjustment of the bolt 33 in accordance with the vertical dimensions of the frame 10. A strap 35 having a similar upper hole 36 and lower slot 37 is positioned on the inner side of the frame 10 for cooperation with the bolts 32 and 33 to clamp the bracket on the frame 10.

In mounting this assembly on the truck, the two bracket units are located on the frame in the proper spacing lengthwise of the truck to receive the tank 15 therebetween and in such relation thereto that the ends of the tank interfit with the flanges 24 and angles 25 as shown. Two tie rods 40 and 41 are inserted in aligned holes in the angles 25, the tank having its corner edges rounded about a sufficient radius to provide clearance for these tie rods as shown. Then when the nuts 42 are tightened on these tie rods with the tank in place, the brackets will clamp the tank firmly therebetween, but since there is no rigid connection between the tank and any part of either bracket, the assembly retains sufficient flexibility to allow for such slight movements of the tank as may tend to take place during use. If desired, when a pair of tanks is used, the brackets on the opposite sides of the frame may be connected by a pair of cross bars 43 such as angle irons.

Vertical displacement of the tank is prevented by a clip 44 secured by a nut and bolt 45 in an appropriately drilled hole in the upper end of each of the diagonal bars 26, and these clips cooperate with the plates 27 to lock the tank positively against both vertical and laterally outward displacement from between the mounting brackets. The mounting assembly is illustrated in Figs. 2 and 3 in combination with a tank of the dimensions shown in Figs. 1 and 7, but since tanks of this character are also available in the configuration shown in Fig. 9, and having considerably similar vertical dimensions, the bars 26 may be provided with an additional drilled hole 46 for receiving the mounting bolt 45 for clip 44 if the alternative size of tank is used.

This mounting assembly has substantial practical advantages. In addition to its simplicity and ease of manufacture, it is adaptable to mounting on truck frames of a wide variety of sizes without drilling, welding or like operations, and especially without such operations which may tend to weaken any part of the structure. Thus in the assembly of Figs. 1–7, the cab 11 overhangs the frames 10 slightly, and the brackets 20 and 21 are accordingly formed with their vertical bars 22 of sufficient height to fit within the overhung portion of the cab for proper mounting on the frames 10. If the bottom of the cab is essentially level about the side frames as shown in Fig. 8 for the side frames 50 and cab 51, the brackets 52 and 53 for the tanks 15 may be of modified construction to the extent that their vertical bars 55 are of reduced height as compared with the bars 22 in order to permit mounting of the tanks closely beneath the cab with their centers of gravity properly positioned with respect to the side frames 50.

Fig. 9 illustrates the application of the invention to a truck having side frames 60 and a cab 61 which are generally similar to those of Fig. 7 but in which the loaded height for the truck chassis is somewhat lower than in the case of Fig. 7. For such uses, safety requires that the tanks be mounted somewhat higher than in the case of Fig. 7, and accordingly tanks 65 of reduced vertical dimensions may be used with the same brackets 52 and 53 as described in connection with Fig. 8. For such uses, as already pointed out, the clips 44 are mounted in the lower pair of holes 46 on the brackets to hold the tanks 65 against vertical displacement.

Figs. 10 and 11 illustrate the application of the invention to a truck of such construction that the cab 71 extends too far laterally beyond and below the side frames 70 for proper use of any of the other arrangements already described. The brackets 72 and 73 are of essentially the same construction as the other brackets already described except that their vertical members 75 are indicated as of a height intermediate those of vertical members 22 and 55, and their horizontal members 76 are also somewhat shorter to fit the lesser corresponding dimension of the tanks 77 required to avoid undue lateral extension on the truck.

Instead of mounting these brackets directly on the side frames 70, however, they are each provided with a pair of spacers 80 and 81 which act to support the bracket and tank assemblies in laterally and outwardly spaced relation to the side frames such that they will be in the proper relation with the cab. The spacers 80 and 81 are of channeled construction with side flanges 82 and 83, and the ends of those members are parallel but at oblique angles to the height of the spacer such that the outer flange 83 is located below the inner flange 82. Both of these flanges are provided with upper holes 84 and lower slots 85, and the inner flange 82 receives the mounting bolts 32 and 33 for direct connection to the side frame 60, while the hole and slot on the outer flange 83 are bolted directly to the corresponding holes in the adjacent bracket 72 or 73.

With this construction as shown, the effective fulcrum point for the tank assemblies will be located both higher and closer to the adjacent side frame 70 than would be the case if, for example, the brackets were mounted directly on the side frames through lengthened vertical members on the bracket, thus materially strengthening and increasing the safety factor for the assembly. At the same time, the tanks are located in the proper positions with respect to the cab 71 to serve as steps, and they also lie properly within the side outlines of the truck as required for safety in use. This same mounting arrangement may also be utilized where other special conditions such as mufflers, torque arms or application valves obstruct the type of mountings shown in Figs. 7–9.

Fig. 12 illustrates the operation of the mounting assembly of Figs. 1–6 in combination with a mounting unit for the air tank commonly provided in large trucks for operation of the brakes. The mounting bracket 90 for the air tank includes a channel member 91 having both of its side flanges turned over at 92 to bear on the back of tank 15, and the connection between this bracket and the frame 10 includes mounting bolts 93 and 94 and a strap 95 corresponding to the similar parts for the brackets 20 and 21. A curved strap 96 is welded to the back of the channel 91 to receive the air tank, and the opposite end of this strap is flanged at 97 for bolting to a suitable adjacent supporting member such as a cooperating strap 99 having a tongue 100 at its opposite end for connection in the slotted lower end of mounting strap 95.

It will accordingly be seen that the invention is applicable to many types of truck constructions and arrangements, and that it is readily adaptable to meet the varying conditions inherent in each such different truck. For all such uses, it adds to its advantages of convenience and economy the important features from the standpoint of maximum safety that it provides for firm and sure mounting of the tank in combination with sufficient flexibility to prevent the development of weakening strains within the assembly while also avoiding looseness capable of permitting undesirable movements of any of the component parts.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A mounting assembly for supporting a fuel tank of the L-step type on the side of the frame of a motor vehicle, comprising a pair of brackets adapted to overlie the opposite ends of said tank, means for securing said brackets to said frame in spaced relation to receive said tank therebetween, each said bracket including a vertical beam member and a horizontal angle member projecting outwardly from the lower end of said beam member, said angle members of said pair of brackets being positioned in facing relation to extend beneath the ends of said tank in supporting relation therewith, adjustable means directly connecting said brackets to clamp said tank endwise into securely supported relation between said brackets, means carried by the outer ends of said angle members for overlapping a portion of the front of said tank in the assembled position of said brackets to prevent lateral outward displacement of said tank from between said brackets, and means carried by said brackets for projection in vertically overlying relation with a portion of said tank to prevent vertical displacement of said tank from between said brackets.

2. A mounting assembly for supporting a fuel tank of the L-step type on the side of the frame of a motor vehicle, comprising a pair of brackets adapted to overlie the opposite ends of said tank, means for securing said brackets to said frame in spaced relation to receive said tank therebetween, each said bracket including a vertical beam member and a horizontal angle member projecting outwardly from the lower end of said beam member, said angle members of said pair of brackets being positioned in facing relation to extend beneath the ends of said tank in supporting relation therewith, adjustable means directly connecting said brackets to clamp said tank endwise into securely supported relation between said brackets, means carried by the outer ends of said angle members for overlapping a portion of the front of said tank in the assembled position of said brackets to prevent lateral outward displacement of said tank from between said brackets, a clip member associated with each said bracket, and means for securing each said clip to its associated said bracket in predetermined position closely vertically overlying an end portion of said tank to prevent vertical displacement of said tank from between said brackets.

3. A mounting assembly for supporting a fuel tank of the L-step type on the side of the frame of a motor vehicle, comprising a pair of brackets adapted to overlie the ends of said tank, means for securing said brackets to said frame in spaced relation to receive said tank therebetween, each said bracket including a vertical beam member adapted to be secured to said frame and a horizontal angle member secured to the lower end of said beam member and projecting therefrom laterally outwardly of said vehicle, said angle members on said pair of brackets being positioned in facing relation to receive and support the opposite ends of said tank, a diagonally arranged brace interconnecting an outer portion of each said angle member with an upper portion of its associated said beam member, tie rods for connecting said angle members to clamp said tank endwise between said angles, and means on the outer ends of said angle members and on upper portions of said brackets respectively adapted to overlap a portion of the front of said tank and a portion of the top of said tank to prevent vertical and lateral displacement of said tank from between said brackets.

4. A mounting assembly for supporting a fuel tank of the L-step type on the side of the frame of a motor vehicle, comprising a pair of brackets adapted to overlie the ends of said tank, means for securing said brackets to said frame in spaced relation to receive said tank therebetween, each said bracket including a vertical beam member adapted to be secured to said frame and a horizontal angle member secured to the lower end of said beam member for projection therefrom laterally outwardly of said vehicle, said angle members on said pair of brackets being positioned in facing relation to receive and support the opposite ends of said tank, a diagonally arranged brace interconnecting an outer portion of each said angle member with an upper portion of its associated said vertical member, tie rods connecting said brackets to clamp said tank endwise between said angles, means on said brackets adapted to overlap a portion of the front of said tank to prevent lateral displacement of said tank from between said brackets, and removable means on said brackets for vertically overlapping a portion of the top of said tank to prevent vertical displacement thereof.

5. A mounting assembly for supporting a fuel tank of the L-step type on the side of the frame of a motor vehicle, comprising a pair of brackets adapted to overlie the ends of said tank, means for securing said brackets to said frame in spaced relation to receive said tank therebetween, each said bracket including a vertical channel member having a portion of at least one side wall thereof turned outwardly thereof to form a flange for abutting the back of said tank, a flange on the other said side wall for overlapping the end of said tank, a horizontal angle member secured to said other side wall of each said vertical member for projection therefrom laterally outwardly of said vehicle to overlap the adjacent end and bottom portion of said tank, tie rods for connecting said angle members to clamp said tank endwise between said angles, and means on said brackets adapted to overlap a portion of the front of said tank and a portion of the top of said tank to prevent vertical and lateral displacement of said tank from between said brackets.

6. A mounting assembly for supporting a fuel tank of the L-step type on the side of the frame of a motor vehicle comprising a pair of brackets adapted to overlie the ends of said tank, means for securing said brackets to said frame in spaced relation to receive said tank therebetween, each said bracket including a vertical channel member having the side walls thereof turned outwardly thereof to form lateral flanges for abutting the back of said tank, a forwardly projecting flange on the outer of said lateral flanges for overlapping the end of said tank, a horizontal angle member secured to said other side wall of each said vertical member for projection therefrom laterally outwardly of said vehicle to overlap the adjacent end and bottom portion of said tank, a diagonally arranged brace member connecting an outer portion of each said angle member with an upper portion of the associated said vertical member, tie rods for connecting said angle members to clamp said tank endwise between said angles, and means on said brackets adapted to overlap a portion of the front of said tank and a portion of the top of said tank to prevent vertical and lateral displacement of said tank from between said brackets.

7. In a fuel tank assembly for mounting on the side of the frame of a motor vehicle, the combination of a fuel tank having an L-shape in end elevation to form a step member for said vehicle, a pair of brackets adapted to overlie the opposite ends of said tank, means for securing said brackets to said frame in spaced relation to receive said tank therebetween, each said bracket including a vertical beam member adapted to be secured to said frame and a longitudinal angle member secured to the lower end of said beam member and projecting therefrom laterally outwardly of said vehicle, said angle members on said pair of brackets being positioned in facing relation to receive and support the opposite ends of said tank, a vertical flange on the outer end of each said angle for closely overlapping the adjacent outer face of said tank to prevent outward displacement thereof, said tank having the lower edges thereof rounded about a radius to provide clearance between each of said edges and the adjacent corners between each said angle and its associated said flange and said vertical member, adjustable tie rods located in said clearances and connecting said angle members to clamp said tank endwise therebetween, and means on said bracket for overlapping a portion of the top of said tank to prevent vertical displacement of said tank from between said brackets.

8. A mounting assembly for supporting a fuel tank on the side of the frame of a motor vehicle, comprising a pair of brackets adapted to overlie the opposite ends of said tank, each said bracket including projecting portions for extending beneath the ends of said tank in supporting relation therewith, adjustable means connecting said brackets to clamp said tank endwise into securely supported relation between said brackets, means including a pair of spacer members for securing said brackets to said frame in outwardly and downwardly spaced relation with said frame to clear overhanging structure of said vehicle, and said spacer members being of vertically extending channel structure and having their lower edges beveled downwardly and outwardly towards said brackets to locate the fulcrum of said assembly in close relation with said frame.

References Cited in the file of this patent

UNITED STATES PATENTS

| | | |
|---|---|---|
| 1,740,232 | Engel | Dec. 17, 1929 |
| 1,797,873 | McManus | Mar. 24, 1931 |
| 2,319,521 | Schneider et al. | May 18, 1943 |
| 2,326,466 | Kitterman | Aug. 10, 1943 |
| 2,357,148 | Turner | Aug. 29, 1944 |
| 2,410,182 | Prior | Oct. 29, 1946 |
| 2,482,885 | Turner | Sept. 27, 1949 |
| 2,622,887 | Prior | Dec. 23, 1952 |

FOREIGN PATENTS

| | | |
|---|---|---|
| 222,990 | Great Britain | Oct. 16, 1924 |
| 300,755 | Great Britain | Nov. 22, 1928 |